Patented Feb. 25, 1947

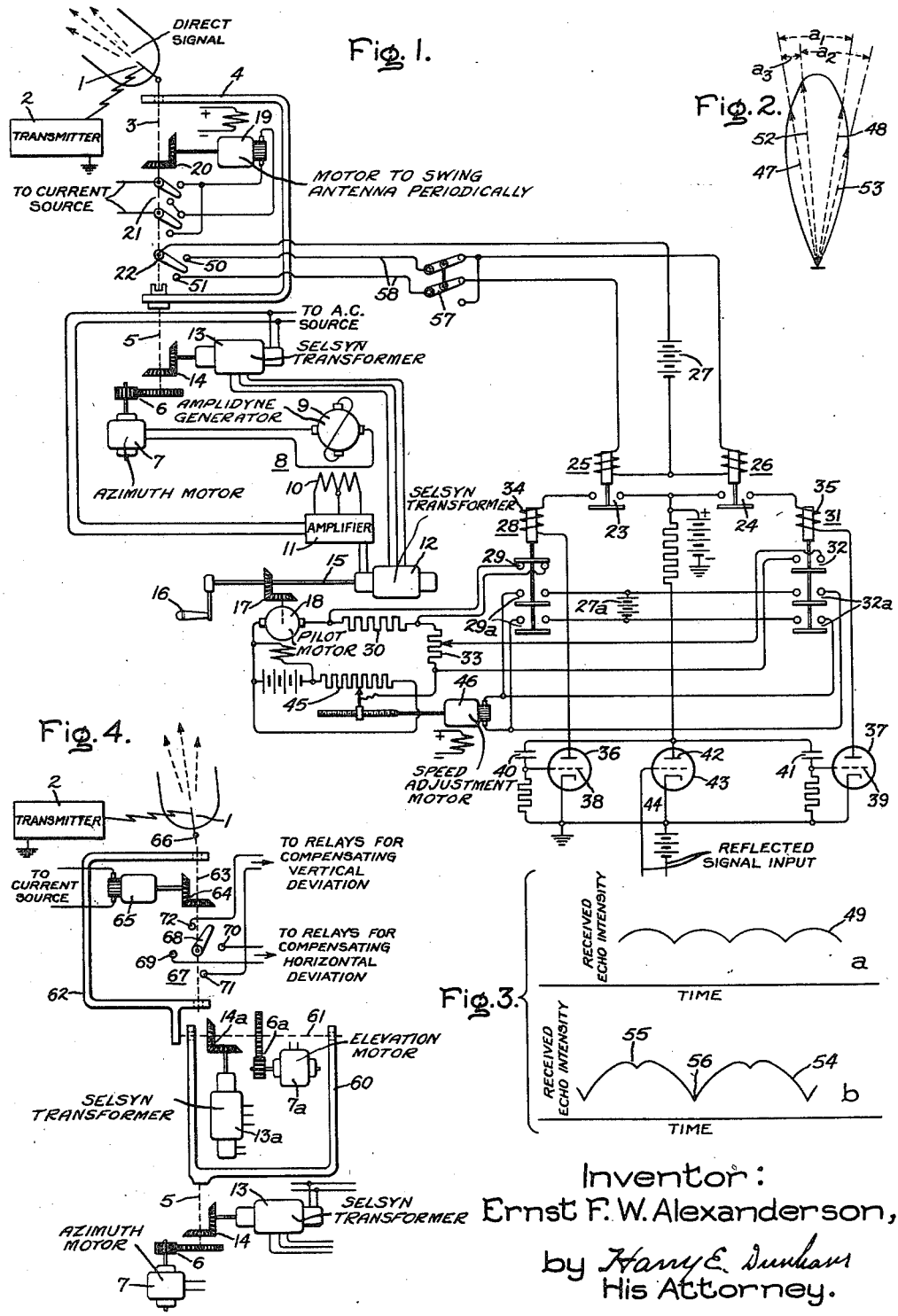

2,416,562

UNITED STATES PATENT OFFICE 2,416,562

FOLLOW-UP SYSTEM

Ernst F. W. Alexanderson, Schenectady, N. Y., assignor to General Electric Company, a corporation of New York Application November 9, 1942, Serial No. 465,014

5 Claims. (Cl. 250—1.54)

1

My invention relates to apparatus for obtaining information concerning the location and movement of a distant object by means of radio echoes or waves emanating or reflecting from the object upon impingement thereon of direct pulses from a transmitting antenna of the apparatus, particularly to follow-up means for causing the beam or pulse from the transmitting antenna to follow a moving object.

The object of the invention is to provide a simple, efficient, and improved apparatus of the above-mentioned character providing sharp angular indications of the position of the remote object and maintaining automatically the beam from the transmitting antenna accurately aimed in the direction of a moving object.

In the use of a radio beam in the detection of moving objects it is recognized that the sharpness of a beam is limited and that to ensure even a moderately sharp beam a relatively large antenna may be required. For obtaining sufficiently sharp angular indications, therefore, it is often necessary or desirable to use, instead of a single beam, the intersection between two beams. In two-dimensional control for the detection of aircraft, for example, four intersecting beams would be required, two for detection of horizontal position and movement of the object and two for detection of vertical position and movement. The effect of two such pairs of intersecting beams may be practically obtained, however, by swinging a single beam laterally and up and down. For the purpose of thus swinging the beam for improved directivity, either electrical or mechanical means may be employed. It is preferable, however, to employ mechanical means, which swing the physical position of the antenna.

In accordance with my present invention a simple and efficient follow-up control arrangement for maintaining the antenna in accurate aim on the object is combined, with slight modification only, with means for physically swinging the antenna to obtain sharp directivity. When two-dimensional control of the resulting highly directive follow-up system is desired, as in airplane detection, the antenna is arranged to swing with a rotating angular motion such that the directive beam is purposely deflected a few degrees from the true direction. In accordance with the present invention, the arrangement of the combined system comprising the follow-up means and the antenna swinging means is such that, when the beam is in its extreme horizontal position of swing, the receiving devices upon

2 which the echoes are impressed give indications which actuate controls for correcting automatically horizontal deviations from the true aim, and when the beam is in its extreme vertical positions the receiving devices give indications which actuate controls for correction of similar vertical deviations.

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawing wherein Fig. 1 is a diagrammatic representation of a one-dimensional control follow-up system embodying my invention; Fig. 2 illustrates the beam from a transmitting antenna adapted to be swung periodically; Fig. 3 illustrates wave shapes of the received pulses or echoes; and Fig. 4 illustrates a follow-up system similar to that of Fig. 1 but having a two-dimensional control.

The system of follow-up control in accordance with my present invention may best be explained in connection with the simpler case represented by the one-dimensional system illustrated in Fig. 1. In this system a transmitting antenna or radiator 1, connected to a suitable pulse transmitter represented by the rectangle 2, is mounted to be rotated horizontally for aiming purposes by a shaft 3 journaled in an appropriate supporting or base member such as a mounting frame 4. For directing the antenna 1 toward a distant object (not shown) the frame 4 together with the apparatus mounted thereon is arranged for rotation as by rigid mounting thereof upon a shaft 5 connected through gearing 6 to a drive motor 7. The latter motor is preferably arranged to be actuated from an amplidyne generator apparatus 8 comprising the usual armature 9 and control winding 10 arranged to be supplied through an amplifier 11 from a rotor winding (not shown) of a control transformer 12. This transformer is also connected electrically to a Selsyn device 13 connected through gearing 14 to the shaft 5, which supports frame 4. The shaft 15 connected to the rotor member (not shown) of the control transformer 12 is connected in the usual manner to a manual control member as crank 16 for preliminary aim of the antenna 1 on the remote object, and by a gearing 17 to a pilot motor 18 arranged to rotate the antenna through amplidyne generator 8 and drive motor 7, thereby to cause the antenna to follow the moving object.

For swinging the antenna 1 continuously back and forth horizontally a few degrees, for example through an angle of five to ten degrees, a motor 19 mounted on the frame 4 by any suitable means (not shown) is arranged to drive the shaft 3 through gears 20. A switch 21 operated by the shaft is provided to reverse the direction of rotation of the motor periodically at the ends of the swing. Any other suitable means for the above-described periodic swinging of the antenna may be employed.

For correcting deviation of the antenna 1 from its true aim on the moving object as the speed of the object begins to change, a switch 22 is provided operated by the shaft 3 to close, at the opposite ends respectively of the periodic swings of the shaft, the normally open contacts 23 and 24 of a pair of relays 25 and 26, energizing current for which may be supplied from a source 27. Relay 25 controls the energizing of a relay or switch means 28 having normally closed contacts 29 connected across a resistor 30 in series in the armature circuit of pilot motor 18. Relay 26 controls the energizing of a relay or switch means 31 having contacts 32 which are normally open, and connected preferably adjustably across a second resistor 33 in series in the armature circuit of pilot motor 18. Energizing current for the armature resistance control relays 28 and 31 is provided by connecting the actuating windings 34 and 35 of the latter relays in series respectively in the anode-cathode circuits of two electron discharge devices 36 and 37. The control electrodes 38 and 39 of discharge devices 36 and 37 are connected through capacitors 40 and 41 to the anode 42 of an electron discharge device or amplifier 43 upon the input circuit 44 of which the echoes or reflected pulses from the object are impressed from a suitable receiving antenna circuit (not shown).

For adjustment of the speed of pilot motor 18 to compensate particularly for wider variations in speed of the remote object, a potentiometer 45 is provided which is arranged to control the armature current. The potentiometer may be manually controlled. Preferably, however, the adjustment is made automatic by any suitable means, for example by a motor 46 arranged to be supplied from a current source as 27a and to be controlled by the relays 28 and 31 through auxiliary contacts 29a and 32a.

In the process of first locating the remote object and thereafter following it by automatic control by use of the system illustrated in Fig. 1, the operator first brings the antenna 1 quickly on the object by the manual direction control means, crank 16, which rotates the moving element (not shown) of control transformer 12, thereby causing the amplidyne 8 to supply current to the drive motor 7 which rotates the frame 4 correspondingly, the Selsyn device 13 operating in the usual manner to stop the frame rotation when the movement of handle 16 ceases.

Let it be assumed first that the antenna 1 is following the moving object accurately, no deviation occurring requiring correction of the aim. In this condition of continued accurate aim, for an arc of periodic swing $a_1$ in the projected beam illustrated in Fig. 2, the beam width and arc of swing being shown exaggerated for clearness, the lines 47 and 48 indicate the received signal or echo intensity at the ends of the swing, and the reflected pulses or echoes received from the object have the form shown by curve 49 of Fig. 3(a).

When the antenna is in its intermediate position during the swing, the switch 22 is open and the various relays 25, 26, 28, and 31 are in their normal position as illustrated in Fig. 1. In this intermediate or normal position of the relays, armature resistance 30 of pilot motor 18 is short-circuited by contacts 29 of relay 28 but armature resistance 33 remains in the armature circuit since contacts 32 of relay 31 are open. The speed of pilot motor 18 when resistance 30 is short-circuited and resistance 33 is not short-circuited is assumed to be approximately the speed required to maintain the antenna in its true aim on the moving object.

At the ends of each cycle of antenna swing the switch 22 closes its contacts 51 and 50 thereby energizing the corresponding relays 25 and 26 to close their contacts 23 and 24. However, no energizing current is then supplied to windings 34 and 35 of relays 28 and 31 through the corresponding electron discharge devices 36 and 37 for the reason that the received signal response when the antenna is aimed accurately on the object and the beam swings symmetrically to right and left is approximately constant as indicated by curve 49 of Fig. 3. Capacitors 40 and 41 of electron devices 36 and 37 absorb the steady state voltage and respond only to substantial changes in the received signal. Therefore no voltages are communicated to the grid circuits of devices 36 and 37 and the latter devices, which are respectively in series with windings 34 and 35, remain non-conducting. The relays 28 and 31 therefore remain in their initial condition as long as the beam is accurately aimed on the object.

Assuming now that the antenna 1 begins to deviate from its correct aim on the moving object. Under this latter condition, for the arc of swing $a_2$ in Fig. 2 to one side or the other of the line of sight from antenna to object, the antenna deviating from the true line of sight by the angle $a_3$ for example, the lines 52 and 53 indicate approximately the intensity of the received signal or echo at the ends of the swing. When the phase of the periodic shift of the antenna changes by the angle $a_3$, that is, when the antenna deviates from the correct aim indicated by the lines 47 and 48 to the position of deviated aim indicated by the lines 52 and 53, the received pulses or echoes then have the cyclically varying wave form shown by the curve 54 of Fig. 3(b).

When the antenna 1 is in its intermediate position during the swing cycle, the switch 22 is open, and again the relays 25, 26, 28, and 31 are in their normal position as illustrated in Fig. 1, armature resistance 30 being short-circuited and resistance 33 remaining in the pilot motor armature circuit.

Let it be assumed that the direction of motion of the object is down from the plane of the paper in Fig. 1, that therefore the rotation of the antenna system in following the object is clockwise looking down upon the antenna shaft 3, and that the antenna is beginning to lag, in its aim, with respect to the object. Under these conditions, at the end of the clockwise swing of antenna 1, or swing in the direction of motion of the object, the switch 22 closes its contacts 51 thereby energizing relay 25 to close its contacts 23. However, no energizing current is then supplied to winding 34 of relay 28 through electron discharge device 36 since the received signal response is approximately constant as indicated at point 55 of curve 54 of Fig. 3 (b). Capacitors 40 and 41 absorb this steady state voltage as before, and no voltage is communicated to the grid circuit of electron discharge device 36, which accordingly remains nonconducting, permitting contacts 29 of relay 28 to remain closed. Therefore no effect on the speed of motor 18 is produced during the half cycle of antenna swing toward the moving object under the assumed condition of aim deviation in a direction lagging with respect to the object.

At the other end of the periodic swing of antenna 1, however, when switch 22 closes its other contact 50, thereby energizing its corresponding relay 26 to close its contacts 24, energizing current is supplied to energizing winding 35 of relay 31 through its corresponding discharge device 37 since, at this other end of the swing cycle, the voltage impressed upon the control electrode of electron discharge device 43 dips down or decreases suddenly, as indicated by curve 54 at point 56 for example, thereby causing a sudden decrease of current drawn through the anode circuit of device 43 and therefore an increase of voltage on this anode circuit which is communicated to the control electrodes of discharge devices 36 and 37. Therefore, on the counterclockwise swing of the antenna 1, or away from the object, the contacts 32 are closed thus short-circuiting resistance 33. Therefore, since the total resistance in the armature circuit of pilot motor 18 is decreased the motor speed is increased correspondingly.

At each cycle of swing of the antenna 1, under the slightly lagging follow-up condition above cited, the pilot motor 18 is therefore speeded up, by periodically short-circuiting the resistance 33 in the armature circuit of the motor, and the antenna is thus restored to its accurate aim in following the object.

Assuming that the antenna now drifts, in its aim, slightly ahead of the moving object. At the end of the counterclockwise swing of the antenna 1, or swing toward the moving object, the switch 22 closes its contact 50 thereby energizing relay 26. Contacts 24 close but no energizing current is supplied to winding 35 of relay 31 through electron discharge device 37 since the received signal voltage impressed upon the control electrode of electron discharge device 43 is approximately constant as shown at 55 of curve 54. Capacitor 41 absorbs the steady state voltage, and discharge device 37 remains non-conducting. The contacts 32 of relay 31 remain open thus leaving resistance 33 in the armature circuit. Therefore no effect on the speed of pilot motor 18 is produced during the half cycle of antenna swing toward the moving object under the assumed condition of aim deviation in the direction leading with respect to the object.

At the other end of the periodic swing of antenna 1, however, the closing of relay 25 through switch contact 51 results in the opening of the contacts 29 of relay 28 since energizing current is supplied to its winding 34 through discharge device 36 which becomes conducting because the received signal voltage dips down, as shown at 56 in curve 54, causing an increase of voltage on the control electrode of discharge device 36. Therefore at the end of the swing away from the object the short-circuit across resistance 30 is removed and a slowing-down effect is produced upon the motor speed.

Therefore at each cycle of swing of the antenna 1 under the slight leading or over-speeding condition of the antenna as above described, the pilot motor 18 is slowed down momentarily and the antenna is restored to its true aim on the object.

In operation of the system as hereinabove described in connection with Figs. 1 to 3, in case the direction of motion of the moving object is up instead of down from the plane of the paper in Fig. 1 and therefore the rotation of the antenna system in following the object is counterclockwise to permit the antenna to follow the object in the new direction, the direction of rotation of the antenna supporting member 4 may be reversed by any suitable means, for example by reversing the pilot motor 18. In order that drift of the antenna from its true aim on the object may be compensated correctly for the reversed direction of motion of the object, the operation of relays 28 and 31 with reference to switch 22 may be arranged to be reversed by any suitable means as by a reversing switch 57 in the leads 58 connecting contacts 51 and 50 respectively with relays 25 and 26. The motor reversing means and reversing switch 57 may be interlocked for simultaneous operation, if desired.

It will be seen that the function of the electronic relay system hereinabove described is to discriminate between the wave shapes represented by curve 49 of Fig. 3(a) and curve 54 of Fig. 3(b). The circuits are so adjusted that the relays 28 and 31 are not energized when a signal is received corresponding to curve 49, whereas these relays do respond to the cyclic variation in the intensity of the received signal which occurs at each cycle of the periodic angular shift of the transmitted signal when the wave shape is as shown in curve 54. It is thus the low point, as point 56 of curve 54, in the signal strength which causes the relay action. This discrimination between wave shape 49 and wave shape 54 is effective regardless of whether the actual signal strength is high or low because capacitors 40 and 41 are provided in the control electrode circuits of electron discharge devices 36 and 37 which absorb the steady state voltage and respond only to changes in signal strength.

It will be seen further that the system is so adjusted that the corrective actions of the speed of the pilot motor 18 are introduced only when they are needed, and then only in the required direction, whereas the relays 28 and 31 are inactive and the motor runs smoothly so long as the aim of the beam is correct.

In the system illustrated in Fig. 1, the automatic control means comprising relays 25, 26, 28, and 31, switch 22, and the means for swinging the antenna periodically, when employed in combination with the electron discharge devices 43, 36, and 37, are well adapted for making the fine adjustments in drive motor speed required to keep the beam accurately on the moving object. The follow-up of the object by the beam which is necessary upon occurrence of wider variations in the speed of the object is then accomplished by adjustment of potentiometer 45. The potentiometer may be arranged for manual control, if desired. Preferably, however, the potentiometer is so arranged as to utilize as a control means the hereinabove described relay system, which lends itself well to making, automatically, the adjustment required for these wider variations of the speed of the moving object.

For this latter purpose the potentiometer 45 is motor driven and its motor 46 is energized for right and left rotation by another set of contacts, 32a and 29a, on the right and left relays 31 and 28 respectively. The action of one of the relays, as 28 for example, then has two effects, the first, resulting from the operation of the main contacts, 29, being an immediate one of changing the speed of the pilot motor 18 slightly as before described. The second effect, resulting from the closing of the auxiliary contacts, 29a, is to change the position of potentiometer 45. This second action is accumulative so that several successive pulses by the relay 28, cause the required major correction in speed of the pilot motor 18 to bring the beam back to its approximately true aim on the moving object.

The two-dimensional detection system illustrated in Fig. 4 is similar to the one-dimensional system of Fig. 1 in that, in the system of Fig. 4, for aiming the antenna 1 to follow the object horizontally, or in azimuth, a supporting member or frame 60, similar to frame 4 of Fig. 1, is provided which is carried by the shaft 5 adapted to be rotated by the azimuth drive motor 7. In Fig. 4, however, in order to accomplish the aiming of the antenna vertically or in elevation, as well as horizontally, a horizontal shaft 61 is mounted for rotation in the frame 60 and the latter shaft carries, rigidly attached thereto, a second supporting member or frame 62 adapted to be rotated in the vertical plane, through gearing 6a, by a drive motor 7a supported on frame 60.

In order to provide for swinging the antenna 1 periodically with a rotating angular motion the antenna is not mounted directly upon the vertically rotatable supporting member 62 but is arranged to be swung by a shaft 63 rotatably mounted in frame 62 at right angles to the shaft 61 and driven through gearing 64 by a motor 65 supported on frame 62 and supplied from a suitable current source (not shown). The antenna 1 is arranged with its axis at a small angle with the axis of shaft 63, as five to ten degrees. For this purpose the antenna may be mounted directly on the outer end of shaft 63 which may be bent to produce the desired angle of the antenna axis with the shaft axis. Or the shaft 63 may be rigidly connected to a supporting member designated by the numeral 66, to which the antenna 1 is connected at the desired angle with the shaft axis. Any other suitable means for swinging the antenna at the proper small angle with reference to the line of sight between antenna and object may be employed.

For aiming the antenna in the horizontal direction and for compensating for horizontal deviation or drift of the antenna 1 from its aim in the system of Fig. 4, it will be understood that the apparatus therefor is in general the same as described in connection with Fig. 1 including elements 6 to 18, 23 to 46, and 57, 58 of the latter figure, and with the exception of the switch means constituted by elements 22, 50, and 51 of Fig. 1. Instead of the periodically swinging switch 22 of Fig. 1 for controlling the relays corresponding to 28 and 31, in Fig. 4, for this purpose a switch 67 is provided preferably having a rotating member 68 operated by the shaft 63 and having two oppositely disposed fixed contacts 69 and 70, corresponding to the contacts 50 and 51 of the switch 22 of Fig. 1.

For aiming the antenna in the vertical direction in the system of Fig. 4, it will be understood that the apparatus therefor includes elements essentially the same as elements 6 to 18 of Fig. 1 but arranged, in Fig. 4, for the rotating of the antenna supporting frame 62 in the vertical plane. Two of this group of elements, 7a and 13a, with their gearing 6a and 14a for control of shaft 61 upon which antenna frame 62 is mounted, are illustrated in Fig. 4.

It will be understood further that for compensating for vertical drift of the antenna in the system of Fig. 4, the relay and detector means therefor include elements such as the relay and detector elements 23 to 46 and 57, 58 of Fig. 1 but, in Fig. 4, operatively associated with the aim determining apparatus connected with the shaft 61 which supports and drives the supporting frame 62 carrying the antenna. As in the case of the horizontal deviation compensating means of Fig. 4, in the apparatus of Fig. 4 for compensation of vertical deviation of the antenna the relay system is controlled by the rotating switch 67, the relay system for the vertical compensation being connected to the oppositely disposed fixed contacts 71 and 72, the arrangement being such that these vertical contacts close alternately with the horizontal contacts 69 and 70.

It will be seen from the foregoing description of the two-dimensional follow-up system of Fig. 4 that in operation of the latter system the automatic compensation for drift or deviation of the antenna is accomplished simultaneously for such drift or deviation in both the horizontal direction and the vertical direction.

The antenna control in accordance with my present invention wherein the antenna is moved so that it will follow a moving object automatically in response to the reflected radio signals is primarily adaptable to use as a gun director to take the place of or augment the telescope in locating a target and in delivering information which may be used for controlling the gun. However, the invention is capable of other uses. For example, a pulse transmitting and follow-up system in accordance with the invention may be located on the ground to send out powerful pulse radiation directed to moving craft such as airplanes which are to be pursued, the pursuing planes not being required to carry the pulse transmitting and follow-up apparatus but having only relatively small and light direction finders which record the echo of the powerful pulses sent out from the ground station and reflected from the pursued planes.

In general, although the invention has been described herein in particular embodiments for purposes of illustration, it is to be understood that the invention is susceptible of various changes and modifications and that by the appended claims I intend to cover any such modifications as fall within the true spirit and scope of my invention.

What I claim as new and desire to secure by Letters Patent of the United States is:

1. In combination, means for projecting a radio beam to a moving object, means for receiving a corresponding signal reflected therefrom, motor means for orienting the direction of said beam toward said object, means for shifting said beam periodically from one side to the other of said direction thereby to cause during deviation of said direction from said object a cyclic variation of the intensity of said signal, and means for correcting automatically the speed of said motor means upon occurrence of said deviation, said last-named means including relay means controlled by said shift means at different positions in the shift of said beam for controlling said motor means and electron discharge means responsive to said cyclic variation for controlling the energizing of said relay means.

2. In combination, means for projecting a radio beam to a moving object, means for receiving a corresponding signal reflected therefrom, motor means for orienting the direction of said beam toward said object in a predetermined plane, means for shifting said beam periodically from one side to the other of said direction thereby to cause during deviation of said object from said direction a cyclic variation of the intensity of said signal, and means for compensating automatically said deviation, said last-named means including a pair of relays controlled by said shift means at different positions thereof and adapted to vary the speed of said motor means and a pair of electron discharge devices responsive to said cyclic variation for controlling the energizing of said relay means.

3. In combination, a transmitter and a directive radiator connected thereto for projecting pulses to a moving object, means for receiving signals from said object corresponding to said pulses, motor means for maintaining said radiator oriented at said object, means for shifting slightly said orientation periodically from one side to the other of said object thereby to cause a cyclic variation of the intensity of said received signals during periods of deviation of said radiator from said object, and means for varying automatically the speed of said motor means to compensate said deviation, said speed-varying means including relay means operatively associated with said motor means and controlled selectively by said shift means at different positions thereof and electron discharge means responsive to said cyclic variation for controlling the energizing of said relay means at said periods of deviation.

4. In combination, means for projecting a radio beam to a moving object, means for receiving a signal therefrom corresponding to said projected beam, means for causing slight periodic angular shift of said beam, and means for restoring automatically said beam to its correct aim upon deviation thereof, said restoring means including means actuated by said shift means for compensating for slight deviation of said beam from said correct aim and means actuated by said shift means for compensating for wider deviations from said correct aim.

5. The combination with a system for indicating the location of a moving object including an antenna for projecting pulses thereto, means for receiving pulses emanating from said object upon impingement thereon of said first-named pulses, means for aiming said antenna initially at said object, and means for moving said antenna to follow said object, of means for producing a swing of said antenna periodically across the line of sight therefrom to said object thereby to cause during a period of deviation of said antenna from its correct aim on said object a change in phase of said periodic swing with respect to said correct aim whereby a corresponding cyclic change of intensity of said pulses emanating from said object is produced, and means operatively associated with said swing means and said receiving means for compensating automatically said deviation.

ERNST F. W. ALEXANDERSON.

REFERENCES CITED

The following references are of record in the file of this patent:

UNITED STATES PATENTS

| Number | Name | Date |
|---|---|---|
| 1,387,850 | Hammond | Aug. 16, 1921 |
| 2,003,661 | Bassett et al. | June 4, 1935 |
| 1,862,119 | Little | June 7, 1932 |
| 2,138,966 | Hafner | Dec. 6, 1938 |